UNITED STATES PATENT OFFICE.

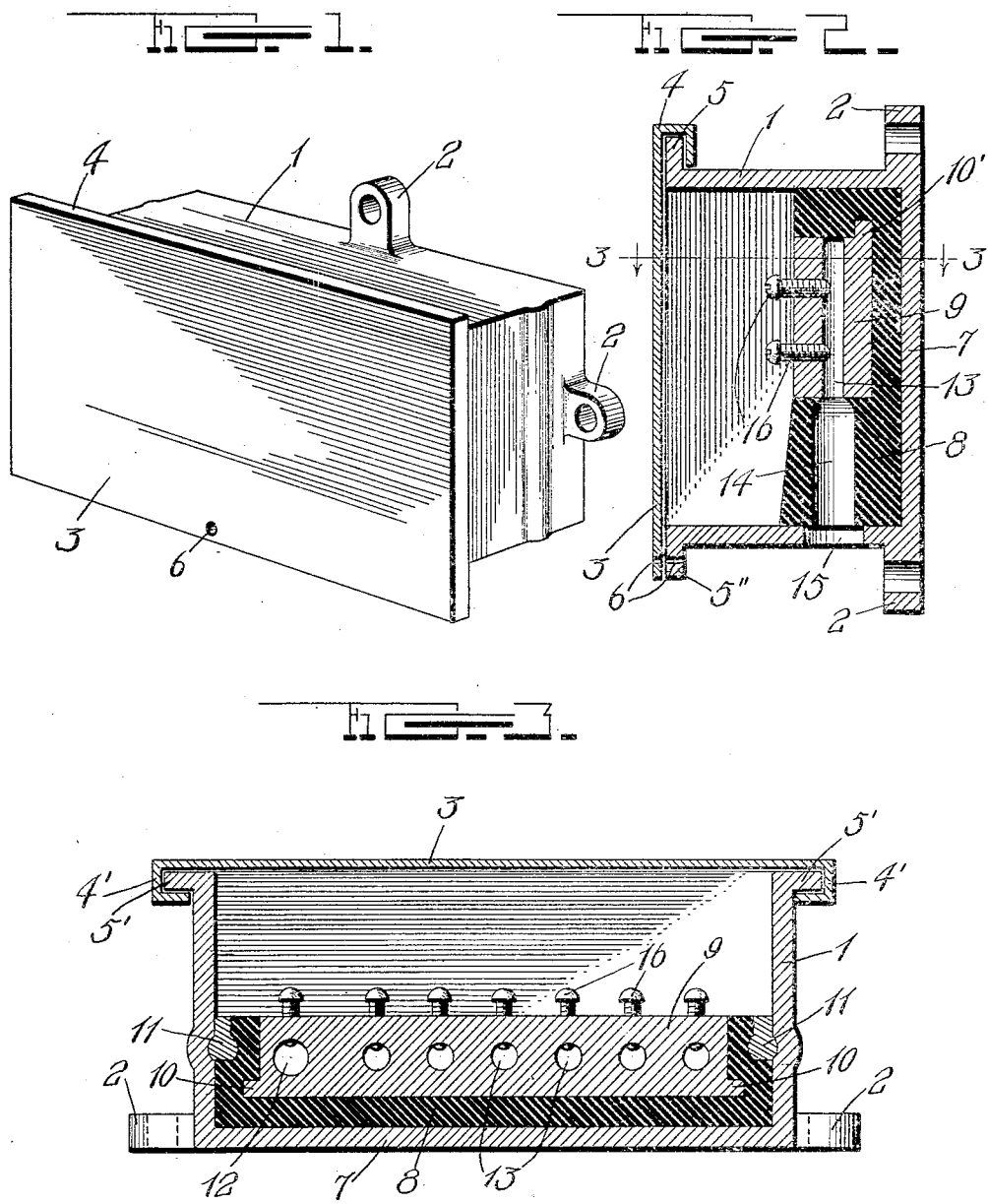

JOHN T. SKINNER, OF LAWRENCE, KANSAS.

MULTIPLE SERVICE CONNECTION.

1,235,069.  Specification of Letters Patent.  Patented July 31, 1917.

Application filed September 21, 1914.  Serial No. 862,783.

*To all whom it may concern:*

Be it known that I, JOHN T. SKINNER, a citizen of the United States, residing at Lawrence, in the county of Douglas and State of Kansas, have invented certain new and useful Improvements in Multiple Service Connections; and I do declare the following to be a full, clear, and exact description of the invention, such as will enable others skilled in the art to which it appertains to make and use the same.

My invention relates to improvements in multiple service connections and has for its object to furnish a convenient, efficient and economical means for connecting one or more electric light and power service lines at one point on the feeder line and also to furnish equally efficient means whereby disconnecting and re-connecting may be accomplished at will and at a small expense for labor and with no expense whatever for solder, tape, etc.

With the above and minor objects in view, the invention resides in certain novel features of construction and combination of parts herein described and claimed and shown in the drawings wherein:

Figure 1 is a perspective view of a service connection constructed in accordance with my invention;

Fig. 2 is a vertical transverse section thereof; and

Fig. 3 is a horizontal section as seen on the line 3—3 of Fig. 2.

In the furnishing of electric light and power to customers, it often becomes necessary to lead a number of service wires from approximately the same point on the feeder line. This necessitates the scraping of the insulation from the wire, the cleaning of the wire and soldering and taping of each of the connections so made. From time to time additional services may be required from or near the same feeder point and it again becomes necessary to make connections as above set forth. On account of the removal of occupants of buildings or their temporary absence, it is frequently desirable to disconnect service wires but at the same time leave them ready for reconnection. A disconnection may be easily accomplished by cutting the wires, but to make a reconnection necessitates the cleaning, soldering and taping of the wires.

In making connections in the above set forth manner, the service of two or more electricians is ordinarily required and the operation takes considerable time. A more convenient, efficient and economical method of making such multiple service connections, re-connections and disconnections is therefore desirable. This I have accomplished by the construction now to be described.

In the accompanying drawings, the numeral 1 designates an elongated rectangular box or casing having its upper and lower side walls and its end walls formed with attaching ears 2, by means of which said box may be supported upon a suitable object. The front of the box is normally closed by a removable front plate 3 which is provided on its upper edge, with a hook-shaped flange 4 which overlies a flange 5, which rises from the top wall of the casing 1, the end walls of said casing being likewise provided with flanges 5' which are engaged by L-shaped flanges 4' on the ends of the plate 3, the lower edge of said plate contacting with still another flange 5'' which depends from the bottom of the casing, said lower edge of the plate and the flange 5'' being provided with alined openings 6 through which a suitable seal (not shown) may be passed.

Located within the casing 1 and contacting with the rear wall 7 and with the upper and lower and end walls of said casing, is an insulating block 8, said block being here shown as formed around a multiple connection bar 9, said bar having upright flanges 10 on its opposite ends and a longitudinal flange 10' on its upper side which are embedded in the insulating block 8, thereby preventing the removal of said bar. The insulating block 8 is here shown as secured within the casing 1 by a pair of keys 11, which are located in co-acting grooves formed in the end walls of said casing and in the adjacent ends of said block. Although these means of securing the bar 9 and insulating block 8 in position are preferable, other means might well be employed.

The bar 9 is here shown as provided with a single upright opening 12 designed to receive a feed wire and with a plurality of smaller upright openings 13 designed to receive the various service wires and probably a ground wire. As clearly seen in the various figures of the drawings, the openings 12 and 13 aline with similar openings 14 formed through the lower portion of the insulating block 8, and the openings 14 register with a slot 15 formed in the bottom of the casing 1. It will likewise be seen that a plurality of clamping screws 16 are provided for the purpose of retaining the various wires within their respective openings, said screws being threaded through bores formed through the front portion of the bar 9 at right angles to the openings 13.

From the foregoing description, taken in connection with the accompanying drawings, it will be seen that an extremely simple yet highly efficient device has been provided for carrying out the objects of the invention, and that the construction employed possesses numerous advantageous features.

Having thus described my invention, what I claim is:

1. A multiple connecting device comprising an insulating block having a plurality of wire receiving openings, a current conducting bar inset in said block and having a shoulder embedded therein, said bar also having a plurality of wire receiving openings alining with the openings in said block.

2. A multiple connecting device comprising a protecting casing, an insulating block secured therein and contacting therewith, said casing having a slot and said block having a plurality of openings alining with said slot, a current conducting bar inset in one side of said block and having a plurality of wire receiving openings alining with the openings therein, and a shoulder formed on said bar embedded in the block.

3. A multiple connecting device comprising a protecting casing having a longitudinal slot in one of its walls, and having internal grooves in the walls disposed at right angles to the slotted wall, an insulating block within the casing and having grooves in its opposite edges co-acting with the first mentioned grooves, said block likewise having a plurality of spaced wire receiving openings, keys located within the grooves of the block and the casing whereby to retain the former in active position, a current conducting bar inset in said insulating block and having a plurality of wire receiving openings alining with the openings in said block and means whereby the wires may be retained in the openings.

4. A multiple service connector comprising a casing having at one side a slot, a permanent block of insulating material secured in the casing and having a plurality of openings alining with the slot therein, a multiple service connecting member permanently inset in the insulating block and having wire receiving openings alining with those in said block, and fastening screws passed through the aforesaid member into the openings therein and having heads exposed to and permanently accessible from the interior of the casing.

5. A multiple service connector comprising a casing having in one side a slot, a permanent block of insulating material secured in the casing and having a plurality of openings alining with the slot therein, a multiple service connecting member permanently inset in the insulating block and having one exposed face, said member being provided with a plurality of wire receiving openings alined with the openings in the block, and fastening screws passed through the aforesaid member into the openings therein and having exposed heads adjacent the exposed face of said member.

In testimony whereof I have hereunto set my hand in presence of two subscribing witnesses.

JOHN T. SKINNER.

Witnesses:
HUGH MEANS,
C. F. MIKESELL.

Copies of this patent may be obtained for five cents each, by addressing the "Commissioner of Patents, Washington, D. C."